2,991,593
ABRADING AND CUTTING TOOL
Murray Cohen, Brooklyn, N.Y.
(106—50 157th St., Jamaica, N.Y.)
Filed Aug. 17, 1959, Ser. No. 834,314
5 Claims. (Cl. 51—5)

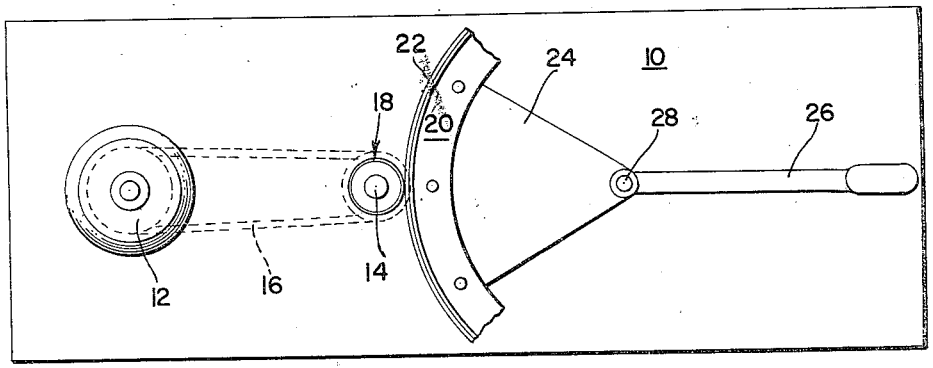
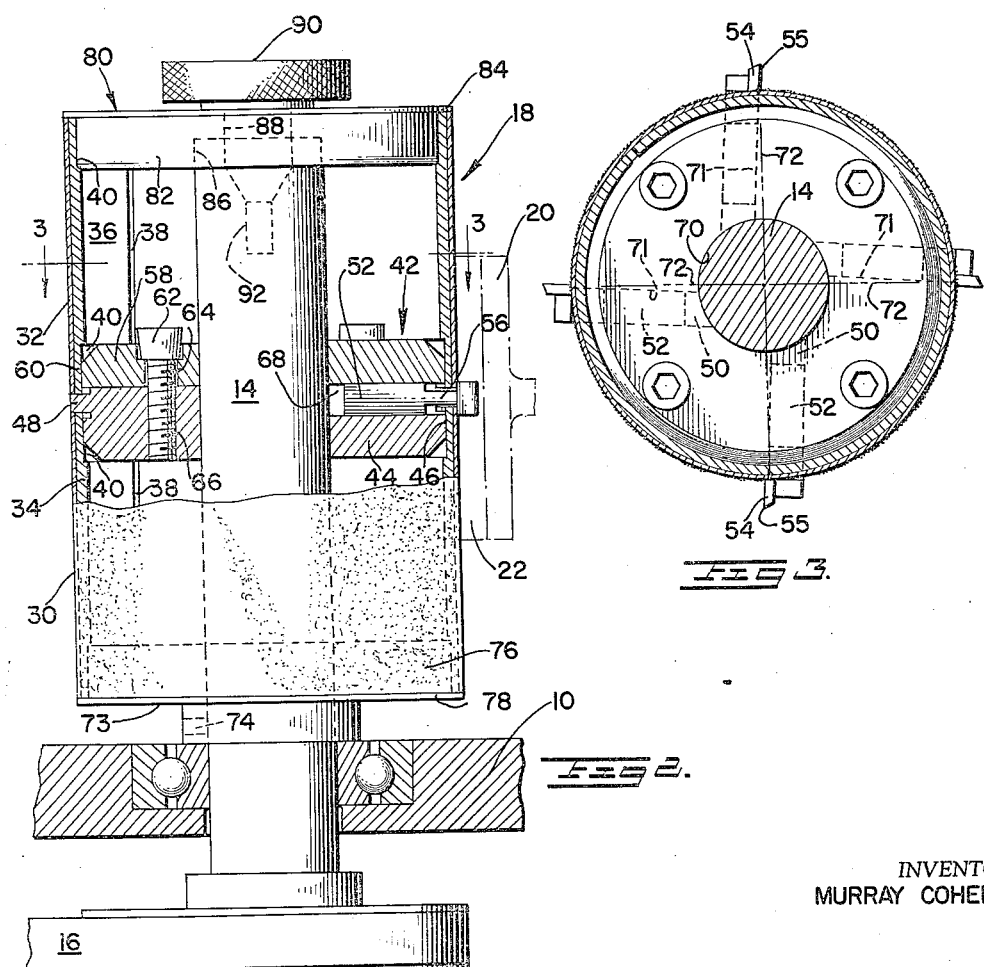

This invention relates to combination abrading and cutting tools and more particularly to a tool for simultaneously dressing and grooving friction surfaces such as brake shoe linings.

Designers and manufacturers of linings for brake shoes of the type which are expandable into frictional engagement with a generally cylindrical drum, such as the brakes commonly used in automobiles today, have found that certain beneficial results are obtained when a groove is formed centrally and longitudinally in the lining. Accordingly, automobile brake technicians and the like are faced not only with the problem of having to dress the frictional surfaces of the brake linings to render them truly circular, but also with the necessity of grooving the linings. In the past, the dressing and grooving operations have been commonly performed on a machine of the type disclosed in U.S. Patents 2,715,799 and 2,820,331 or on like machines wherein a rotary spindle spaced from and parallel to the axis of an oscillatory brake shoe holder is equipped first with a cylindrical abrading tool for properly dressing the brake shoe lining surface, as described in the patents. After the truing or dressing operation, the cylindrical abrading tool is removed from the spindle and a relatively narrow grooving tool is placed thereon. Thus, prior to this invention, the means available to brake repairmen for such dressing and grooving of brake shoes required two separate and distinct operations. Not only was this procedure time consuming, but also certain inaccuracies in the grooving operations were incurred because the depth of groove placed in the lining was regulated solely by adjusting pivotal axis of the brake shoe holder and because of the additional prospect of human errors encountered thereby.

A principal object of this invention is to provide a new and unique tool for simultaneously dressing and grooving brake shoe linings.

Another object of this invention is the provision of a combination brake shoe lining dressing and grooving tool which is readily adapted to use on existing machinery.

A further object of this invention is to provide a highly effective combined brake shoe lining dressing and grooving tool which, when incorporated in existing machinery available to brake repairmen, greatly simplifies the combined dressing and grooving of brake shoe linings.

Another object of this invention is that of providing a combined brake shoe dressing and grooving tool of the type referred to, which enables the economic use of abrading materials.

A further object of this invention is the provision of a brake shoe dressing and grooving tool by which any desired width or depth of groove may be placed in the brake shoe lining without requiring adjustment of the lining with respect thereto.

A still further object of this invention is the provision of a combined brake shoe and grooving tool of the type referred to, incorporating means for very securely accurately holding and positioning a plurality of grooving cutters with respect to the brake shoe lining abrading surfaces.

Other objects and further scope of applicability of the present invention will become apparent from the detailed description given hereinafter. It should be understood, however, that the detailed description, while indicating preferred embodiments of the invention, is given by illustration only, since it will become apparent to those skilled in the art from this description, that various changes and modifications can be made without departing from the spirit and scope of this invention.

In general, the aforementioned objects are accomplished by a tool featuring a pair of generally cylindrical abrading members supported on a pair of generally cylindrical tubular mandrels concentric therewith, the respective abrading member and mandrel assemblies being telescopically received on both sides of a central cutting tool holder, which holder is arranged to secure a plurality of cutting tools in a generally radial position and extending past the abrading surfaces of the abrading members by an amount substantially equal to the depth of groove desired in the brake shoe liner. The cutting tool holder is centrally apertured to a diameter such that it may be slidably received on a rotary spindle. The rotary spindle is in turn equipped with a circular boss member at its base portion and a similarly shaped cap member, such that each of the abrading member mandrel assemblies are retained coaxially between the boss member and the tool holder, and the tool holder and the cap member, respectively.

A more complete understanding of the new and unique brake shoe lining dressing and grooving tool of this invention and its method of use may be had by reference to the accompanying drawing in which:

FIG. 1 is a plan view showing schematically the general organization of a machine with which the dressing and grooving tool of this invention may be used;

FIG. 2 is an elevation in partial cross section showing the brake shoe dressing and grooving tool of this invention mounted on a machine spindle; and FIG. 3 is a cross sectional plan view taken along the lines 3—3 of FIG. 2.

Referring to FIG. 1 of the drawings, the basic components of a machine with which the new and unique tool of this invention are most suitably adapted for use are shown including a base 10, on which is mounted a motor 12 for imparting rotation to a spindle 14, such as through a drive belt 16. Mounted for rotation with the spindle 14 and concentrically thereon is the combined dressing and grooving tool of this invention, generally designated by the numeral 18, the details of which will be discussed fully below. A brake shoe 20 having a lining on the peripheral face thereof designated by the numeral 22, is held firmly on a holder 24 having a handle extension 26 to permit an oscillatory movement about a shaft 28, the axis of which is parallel to the axis of the tool holding spindle 14 and spaced from the periphery of the abrading and cutting tool 18 a distance equal to the radius of curvature to be imparted to the brake shoe lining 22. A complete understanding of the structural and operational details of a machine having these basic components may be had by reference to either of the aforementioned U.S. Patent Numbers 2,715,799 and 2,820,331, so that no further discussion of such a machine is necessary herein. Further, it is to be understood that while machines of this type are particularly suitable for the use of the tool of this invention, other machine structures having similar operational characteristics can be employed.

Referring to FIGS. 2 and 3 of the drawings, the combined brake shoe lining grooving and dressing tool of this invention is shown having a pair of generally cylindrical abrading members 30 and 32 supported on a pair of substantially cylindrical mandrels 34 and 36, respectively. Both of the mandrels are slotted as at 38 along the line extending axially thereof to provide a sufficient amount of resiliency so as to facilitate their insertion into the abrading members 30 and 32. It will be noted that the axial length of each of these abrading members is approximately twice that of the brake shoe lining width normally incurred and further that the supporting mandrels 34 and 36 are of uniform thickness over their central portion, but at their ends, are formed having annular recesses 40. Thus, when one-half of each of the abrading members 30 and 32 becomes worn, since the structure thereof, as well as the mandrels 34 and 36 are symmetrical, they may be merely turned end for end to place the unused portion thereof in position to abrade or dress the lining.

The mandrels 34 and 36 and correspondingly the abrading members 30 and 32, are retained in axial alignment but spaced from one another by telescopic engagement with a cutting tool holder generally designated by the numeral 42. The holder 42 includes a base having a cylindrical portion of such diameter to snugly receive the recessed annulus 40 of either of the mandrels 34 or 36 (in this instance, the mandrel 34 as shown in FIG. 2), an enlarged annular rim portion 48 and a plurality of recesses 50 for receiving the shank portions 52 of a plurality of cutters 54 having leading or cutting edges 55.

The cutters 54 are of a hard tool material, such as tungsten carbide or the like, and are received at the forward edge of a necked-down portion 56 of the cutting tool shanks 52. The necked-down portion is of the same thickness as the annular ridge 48 on the base 44, such that no interference with the mounting of the mandrels 34 and 36 on the holder 42 is incurred. Also, it will be understood that the dimensions of the cutters 54 may be varied depending on the dimensions of the groove desired to be placed in the brake shoe liner 22.

The cutting tool holder 42 is also provided with a head 58 having a cylindrical periphery 60 for receiving the mandrel 36, as shown in FIG. 2. The diameter of the cylindrical portion 60 on the head 58 is the same as the diameter of the cylindrical portion 46 on the base 44, both being such that either of the mandrels 34 may be snugly and telescopically received thereover.

The head 58 also serves the important function of retaining the cutting tool shanks 52 in an adjusted position within the grooves 50 in the base of the tool holder. For this purpose, a plurality of bolts 62 are provided, which extend through apertures 64 in the head and are threadably received in apertures 66 in the base 44. The depth of the recesses 50 is slightly less than the thickness of the cutting tool shanks 52, such that when the head 58 is clamped downwardly against the base 44 by drawing up screw bolts 62, the tool shanks are firmly and securely held between the bottom of the groove 50 and the radial surface 68 of the head member 58.

It will be noted that the tool holder 42 is provided with a central aperture 70 to permit insertion over the spindle 14, as will be described more fully below.

Further, the grooves 50 are so positioned in the base 44 so as to effectively position the cutters 54 about the periphery of the abrading members 30 and 32. This is accomplished by placing the leading edge 71 of each groove 50 approximately on diameters 72 of the tool holder 44 at the circumference thereof as shown in FIG. 3. From the intersection of a diameter 72 in the circumference of the tool holder 42, the leading edge 71 of each of the grooves 50 extends inwardly at a slight acute angle with respect to the diameter of the holder. Accordingly, the cutting tools 54 are disposed such that their leading edges 55 are at their bases diametrically opposed about the tool holder and lean at a slight angle in the direction of cutting. Preferably, this angle is approximately 2°, though it will be understood that the grooves 50 may be arranged at other comparable angles with respect to the diameters of the tool holder without departing from the spirit and scope of this invention.

Referring now to the manner in which the new and unique dressing and grooving tool of this invention is mounted on the machine spindle 14, it will be noted that at the base of the spindle is mounted a generally circular boss 73 secured for rotation with the shaft 14, such as by set screw 74 and having a cylindrical body portion 76 terminating at its bottom in an enlarged annular ledge portion 78. The diameter of the circular cylindrical portion 76 is substantially the same as the cylindrical portions 46 and 60 on the tool holding member 42, while the diameter of the annular ledge 78 is sufficiently large to prevent either the mandrel 34 or the abrasive member 30 from sliding axially beyond it.

Provided at the top of the spindle 14 and also rotatable therewith is a cap 80 having substantially the same circular configuration, though inverted, as the boss 73, insofar as it is formed having a cylindrical body portion 82 and as well an enlarged annular portion 84. The central portion of the cap 80 is formed having a circular recess 86 of slightly larger diameter than the diameter of the spindle 14 which recess extends partially into the body portion 82 of the cap. A relatively smaller central aperture 88 extends from the recess 86, through to the opposite side of the cap 80 to accommodate a threaded bolt 90 which in turn is engageable in an internally threaded or tapped bore 92 extending axially into the end of the spindle 14.

Thus, to assemble the tool of this invention onto the machine spindle 14, first the mandrels 34 and 36 are inserted within the abrasive members 30 and 32, respectively. This is greatly facilitated by the gaps 38 in the mandrels since they may be compressed to a sufficiently small diameter and then left to spring back firmly against the inner surface of the abrading members, once in place. The mandrel 34 is then positioned on or telescopically received by the cylindrical portion 76 of the boss 73. Having determined the size groove desired to be placed in brake liner 22, the user selects the proper size cutter 54, inserts them into the grooves 50 such that they extend radially beyond the tool holder 42 to the proper amount, and clamps them in place by tightening screw bolts 62. The cutting tool and tool holder assembly is then placed over the spindle 14, and slid downwardly thereon until the cylindrical surface 46 is received snugly within the annular recess 40 on the mandrel 34, and the enlarged annular rim abutting the end of the mandrel and abrading element 30. The mandrel 36 having the abrading element 32 thereon is then placed on the holder 42, such that the annular recess 40 therein is telescopically engaged with the cylindrical portion 60 on the tool holder. In like fashion the cap 80 is placed over the spindle 14 such that the recess 86 is firmly engaged therewith, and accordingly the cylindrical portion 82 thereof is engaged with the recess 40 of the mandrel 36, the screw bolt 90 threaded securely down into the threaded bore 92 to complete the assembly.

The operation of the device thus described is generally similar to the operation of the devices described in the U.S. patents referred to above, that is, having the tool 18 mounted on the spindle 14 in the manner shown in FIG. 2, and the brake shoe and lining 20 and 22, respectively, mounted on the holder 24, the motor 12 is turned on to rotate the spindle and accordingly the tool 18 at high rotational velocity. Having correctly positioned the pivotal axis 28 of the holder 24 with respect to the tool 18, the handle 26 is merely moved back and forth to oscillate the brake shoe and brake shoe lining 22 past and in engagement with the abrading members 30 and 32, and as well the cutters 54. Since the cutters extend past the abrasive surface of members 30 and 32, a groove will be provided in the liner 22 to this extent, and of course, at the same time, the abrasive members function to dress the frictional surfaces of the liner 22.

From the foregoing description, it will be readily understood that the stated objectives are fully achieved by this invention. The new and unique combined brake dressing and grooving tool provided thereby is extremely effective to simultaneously groove and dress the frictional surfaces of a standard brake shoe lining. As has been indicated, the assembly thereof onto a spindle of existing machinery available to brake repairmen is highly satisfactory in the sense that it requires no particular or special tools and in no way requires any modification to such a spindle as it is presently available on existing machinery. Further, the cutting tools are firmly and securely held within the tool holder 42, and yet are adaptable to any desired brake shoe liner groove configuration in that they may be adjusted inwardly or outwardly, or if desired the cutting head may assume wider dimensions. The foregoing description, however, is illustrative of a preferred embodiment of this invention, and since many possible changes may be incorporated therein, it is to be understood that the true spirit and scope of this invention are to be determined by the appended claims.

I claim:

1. A dressing and grooving tool for brake shoe linings comprising: a pair of tubular abrading members; a cutting tool holder positioned axially between said members, said holder being formed to telescopically receive said members; and a plurality of cutting tools extending from said holder radially beyond the working surfaces of said abrading members.

2. The dressing and grooving tool recited in claim 1 in which said tools have shanks and in which said tool holder comprises: a generally cricular base member having a plurality of cutting tool shank receiving grooves, the leading edges of which intersect diametric lines at the circumferential edge of said base member and make with said lines an acute angle; a generally circular head member having a planar radial surface; and means for clamping said head member against said base member whereby said tool shanks are retained against radial movement in said grooves.

3. A tool for simultaneously dressing and grooving brake shoe linings comprising: a pair of tubular abrading members; a pair of tubular mandrels for supporting each of said abrading members, respectively; a holder for said mandrel and abrading member pairs, said holder being formed to receive said mandrels telescopically and one to either side thereof; and a plurality of cutting tools carried by said holder so as to extend radially past the exterior surfaces of said abrading members.

4. Apparatus for dressing and grooving brake shoe linings comprising in combination: a rotatable spindle, a brake shoe holder oscillatory about an axis parallel to the axis of said spindle; a circular boss member concentrically mounted at the base of said spindle and rotatable therewith; a centrally apertured circular cutting tool holder concentrically positioned on said spindle above said boss member; a circular cap member carried concentrically on the top of said spindle; a pair of cylindrical abrading members positioned concentrically on said spindle, one between said boss member and said tool hodler, the other between said tool holder and said cap; and a plurality of cutting tools carried by said tool holder and extending radially beyond the exterior surfaces of said abrading members.

5. The combination recited in claim 4 in which said cutting tools have shanks and in which said tool holder comprises: a base member formed having a cylindrical peripheral portion and a plurality of tool shank receiving grooves, the leading edges of which intersect diametric lines at the circumference of said portion and extend inwardly at a slight angle to said lines; a cylindrical head member having a planar surface for retaining the shanks of said cutting tools in said grooves; and means for clamping said base and head members axially on said tool shanks.

References Cited in the file of this patent

UNITED STATES PATENTS

| | | |
|---|---|---|
| 783,946 | Gregory | Feb. 28, 1905 |
| 1,735,891 | Bryant | Nov. 19, 1929 |
| 2,345,161 | Thomason | Mar. 28, 1944 |
| 2,734,319 | Billeter | Feb. 14, 1956 |

FOREIGN PATENTS

| | | |
|---|---|---|
| 372,717 | Great Britain | May 12, 1932 |